United States Patent [11] 3,621,325

[72] Inventor Lee R. Moffitt
    Colorado Springs, Colo.
[21] Appl. No. 853,788
[22] Filed Aug. 28, 1969
[45] Patented Nov. 16, 1971
[73] Assignee Hewlett-Packard Company
    Palo Alto, Calif.

[54] TIME DELAY REFLECTOMETER
    8 Claims, 1 Drawing Fig.
[52] U.S. Cl. .................................................... 315/25,
    324/121, 328/151
[51] Int. Cl. ...................................................... H01j 29/72
[50] Field of Search ........................................... 315/25;
    324/121; 328/151

[56] References Cited
    UNITED STATES PATENTS
3,466,553  9/1969  Stuckert ........................  315/25 X
3,531,802  9/1970  Brown et al. .................  328/151 X Primary Examiner—Rodney D. Bennett, Jr.
Assistant Examiner—Brian L. Ribando
Attorney—A. C. Smith ABSTRACT: A sampling circuit for an oscilloscope includes feedback circuitry to the sampling gate for enhancing the sampling efficiency and also includes a sweep generator that produces stepwise increment of sweep voltage per selected number of samples. The sampling efficiency may be decreased and the number of samples per step may be increased to provide an averaging effect on the samples taken of noisy signals. Also, selective delay may be introduced between generation of a test pulse used, for example, to step-response test a circuit element and the initiation of a sweep cycle.

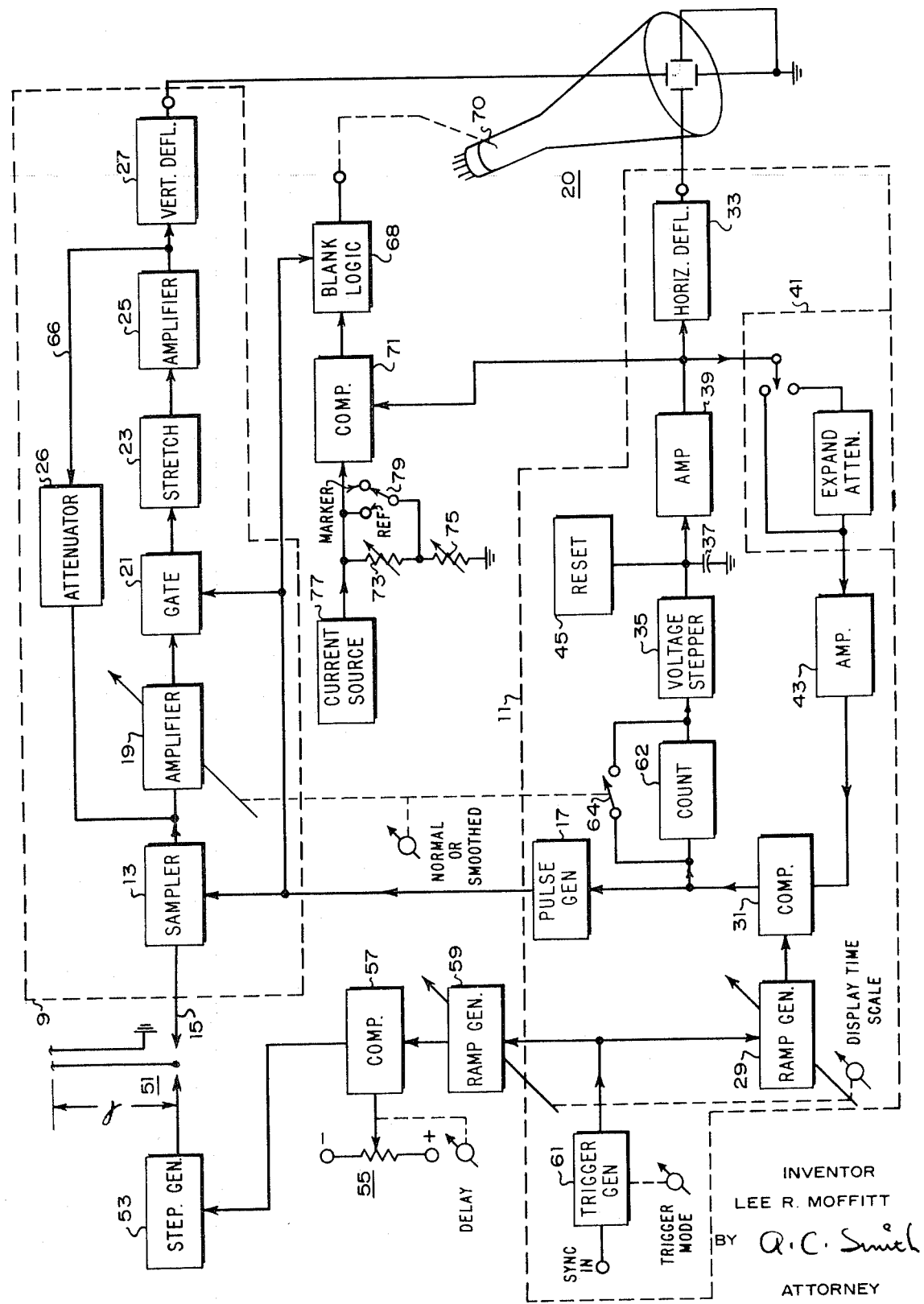

3,621,325

TIME DELAY REFLECTOMETER

BACKGROUND OF THE INVENTION

Certain known sampling oscilloscope circuits commonly provide a single sample display per each recurrence of the sampled signal where each such sample display is incrementally displaced horizontally from the location of the previous sample display. The waveform of a recurring signal may thus be reconstructed and displayed as a series of regularly spaced dots. However, where the recurring signal is accompanied by noise or time jitter, the sample reconstruction of such a signal commonly is unintelligible because adjacent samples may vary widely in amplitude and not provide any information about the waveform of the recurring signal. Also, where the waveform being sampled is normally a transient condition, like the step-function response of a circuit element, such a transient condition must be repeated sufficiently frequently to permit sampling of the transient condition of an adequate number of times to permit display of the reconstructed samples over a sweep cycle. This, however, requires that the samples of the transient condition be taken at successively delayed increments with respect to the occurrence of the transient initiating pulse event.

SUMMARY OF THE INVENTION

Accordingly, the present invention provides signal sampling circuitry, sampling sweep circuitry and pulse generating circuitry which may all be synchronized in a manner that is useful for making time-domain reflectometry measurements. Signal samples may be selectively averaged to provide a clear display of the desired signal in the presence of noise. This is accomplished by decreasing sampler efficiency and accumulating a plurality of samples at a given display location before advancing the display sweep in a stepwise manner to the next sample display location. In this manner, the signal-to-noise ratio of the sampled signal is enhanced as manifested by a clear, stable display of the reconstructed samples.

DESCRIPTION OF THE DRAWING AND PREFERRED EMBODIMENT

The drawing is a schematic diagram of the circuitry of the present invention.

In the drawing, there is shown a signal-sampling portion 9 and a sampling sweep generating portion 11 connected to supply samples and sweep signals, respectively, to the vertical and horizontal deflection circuits of an indicating device 20 such as an oscilloscope. The sampling circuit includes a sample 13 which is connected to receive an input 15 for producing samples of the input in response to a sampling control signal applied thereto from the sampling pulse generator 17. The amplifier 19 applies sample pulses from the sampler 13 to the gate 21 which is also actuated by generator 17. The stretcher or storage element 23 receives the amplified sample pulses during gate conduction and provides a steady output during the intervals between sample pulses at substantially the amplitude of the previous sample pulse. The steady output from stretcher 23 is amplified by unity gain amplifier 25 and is applied to the vertical deflection circuit 27 and, as a positive feedback signal, is also applied through attenuator 26 to the output of sampler 13. This feedback signal enhances the sampler efficiency by supplying in-phase signal to the distributed reactances of the sampler 13 so that the effective response of the sampler 13 supplies a sample pulse having an amplitude which is substantially equal to the amplitude of the input signal at the sampling instant (i.e. approximately 100 percent sampling efficiency). Circuits of this type are described in the literature (see, for example, U.S. Pat. No. 3,011,129 entitled PLURAL SERIES GATE SAMPLING CIRCUIT USING POSITIVE FEEDBACK issued Nov. 28, 1961 to K. B. Magleby and V. E. Van Duzer).

The sampling sweep generator 11 includes a ramp signal generator 29 and a comparator 31 for initiating the sampling instants when the ramp signal attains the level related to the stairstep sweep signal applied to the horizontal deflection circuit 33. The stairstep waveform is produced by the stepper or monostable multivibrator 35 supplying fixed increments of charge to the capacitor 37 each time the stepper 35 is triggered. The potential across the capacitor 37 thus varies in a stepwise fashion for recurring triggering of stepper 35. The amplified stairstep signal from amplifier 39 is applied to the horizontal deflection circuit 33 and through the selective sweep expansion circuitry 41 and amplifier 43 to the comparator 31. The comparator 31 thus produces successive outputs at times that are successively delayed from the starts of ramp signals from generator 29 and each such output initiates the sampling instants by triggering the sampling pulse generator 17. At the same time, the output of comparator 31 triggers the stepper 35 to increment the potential across capacitor 37. The reset circuit 45 coupled to capacitor 37 discharges the capacitor and terminates the stairstep display sweep when the capacitor potential attains a selected maximum value. Sweep circuits of this type are described in the literature (see, for example, U.S. Pat. No. 3,010,071 entitled SWEEP CIRCUIT issued Nov. 21, 1961 to A. R. Carlson).

For transient-response testing of a circuit element such as a length of transmission line 51 (i.e., time-domain reflectometry), a transient-initiating signal such as a fast-rise pulse or step may be applied to the circuit element 51 from a triggered step generator 53. This generator 53 may be triggered at instants which are determined by the voltage value of the delay setting 55. This voltage value is applied to comparator 57 which also receives a ramp signal from generator 59 that is similar to the signal from generator 29. In another embodiment of the invention, the signal to be compared in comparator 57 with the delay voltage value 55 may be supplied directly from generator 29. However, interactions between comparators 31 and 57 creating display jitter and noise may be eliminated by using separate similar generators 29 and 59, each triggered simultaneously with appearance of a trigger signal from the trigger generator 61. The trigger generator 61 may be a conventional trigger generator which can be set to free run or to trigger only on applied synchronizing inputs. Thus, the step generator 53 is triggered a fixed delay period after appearance of a given trigger signal from generator 61 (i.e., determined by the amplitude of the delay voltage setting 55) while the sampling pulse generator 17 is triggered a variable delay period after appearance of the given trigger signal (i.e., determined by the amplitude of the stairstep sweep signal derived from capacitor 37).

The time scale for the display on the indicating device 20 is determined by the setting of the ramp slope of the ramp generator 29. The comparator 31 produces outputs at parity of compared signals and the potential across capacitor 37 is incremented through an entire sweep cycle to its maximum or reset value. Thus, the time increment between sample points may be altered on the reconstructed waveform display on the indicating device 20 by manually selecting various values of the ramp slope of generator 29. However, a change of display time scale may cause a shift of position in the display of the leading edge of the pulse from step generator 53. But, by varying the ramp slope of generator 59 according to the present invention in accordance with changes in the display time scale, the position in the display of the leading edge of the pulse from step generator 53 may be retained in the same display position without repositioning adjustments. In this manner, an input signal may be displayed on a slow display time scale which is indicative of a certain distance scale and then the time scale may be expanded to magnify the distance with respect to the leading edge of the pulse from the step generator 53 without altering the display position of this leading edge.

Normal signal sampling and sample display are performed at substantially 100 percent sampling efficiency in order to preserve signal fidelity. However, where signal jitter and noise tend to destroy the composite sample-dot display of the sampled signal, the sample display may be smoothed to eliminate the effects of noise and jitter in accordance with the present invention. This is accomplished by taking a plurality of samples for a given display position and then displaying the accumulated sample amplitude at the given display position on the display device 20. The number of samples to be taken per display position (i.e., per step of the stairstep sweep voltage) is determined by the counter 62 which is shunted through switch 64 or otherwise rendered ineffective during normal sampling operation. This counter may be a conventional digital or analog pulse divider which produces an output per selected number (say, ten) of input pulses. Thus, in the smoothed mode of operation, the comparator initiates, say, 10 sampling instants before stepper 35 may increment the stairstep sweep signal to establish the next display position. Also, in the smoothed mode of operation, the sampling efficiency is reduced, say, to about 10 percent, for example, by decreasing the loop gain in the sampling circuitry. This may be conveniently accomplished by decreasing the gain of amplifier 19, as shown in the illustrated embodiment. The effect of the reduced sampling efficiency is that several samples are required to bring the stretched sample-pulse amplitude up substantially to the actual value of the sampled input signal at the sampling instants. This sample accumulation or noise-averaging sampling thus provides a stabilized composite display of the signal samples with substantially reduced noise or jitter.

Time-domain reflectometer measurements conventionally provide a display which relates the distance along a transmission line to the elapsed time from the start of a display sweep. Thus, a discontinuity in a transmission line at a certain distance from a reference or input end produces a display waveform characteristic of the discontinuity at a display position from the sweep start which is representative of the distance along the line from its input to the discontinuity. This distance to a discontinuity may be indicated directly in accordance with the illustrated embodiment of the present invention by intensifying selected samples to serve as display markers and by calibrating in units of distance the value of positioning voltage required to position an intensified sample at the selected displayed event. Normally, the display device 20 is blanked or rendered ineffective to produce a display except at the locations of sample pulses. This is accomplished by conventional blanking logic circuitry 68 operating, say, on the blanking grid 70 of a cathode-ray display tube in response to sampling pulses received from pulse generator 17. The selective intensification of a sample (e.g., enhancing its displayed intensity relative to other samples) is accomplished by comparator 71 which compares the amplitude of the stairstep sweep signal with a marker positioning voltage derived from variable divider resistors 73 and 75. In operation, a current source 77 supplies current to these resistors 73 and 75 to produce a marker positioning voltage thereacross related to their resistance value. Variable resistor 73 is calibrated in units of distance and is shunted by a switch 79 which may be actuated, first, to shunt the resistor and then, second, to insert the resistor 73 in the divider network. While resistor 73 is shunted by switch 79 (Reference position), the remaining resistor 75 may be varied to provide a marker positioning voltage that corresponds to any reference location (say, zero or the start) in the displayed sweep. Thereafter, with switch 79 open, resistor 73 may be adjusted to produce a marker reference potential across both resistors 73 and 75 which corresponds to the position of a selected display sample in the sweep. At each comparison of positioning voltage and stairstep sweep voltage made by comparator 71, the resulting comparator output causes the blanking logic circuit 68 to intensify the sample displayed at the selected location. The distance, *l*, from the reference marker position (say, zero or the start, as selected by resistor 75) to a selected marker position at the characteristic display of a discontinuity such as an open circuit may thus be determined directly from the distance calibration of resistor 73.

Therefore, the sweep and sampling circuitry of the present invention provides selective time delay between test pulse and sampling sweep to eliminate the shift of position of the leading edge of the test pulse as the time scale for the display is altered. Also, jitter and noise on a sampled signal may be eliminated by the smoothed sampling of the present invention and display markers may be selectively positioned on the displayed waveform to provide a direct readout in units of distance between a reference event and a selected displayed event.

I claim:

1. A signalling circuit comprising:
   a generator for producing a staircase signal having stepwise variations in amplitude in response to trigger signals applied thereto;
   a comparator having a pair of inputs for producing an output trigger signal in response to signals applied to the inputs thereof attaining a predetermined relationship to each other;
   a source of recurring signal of time-varying amplitude;
   means connected to the inputs of said comparator for applying thereto the signals from said generator and said source;
   circuit means including a pulse-count divider connected to said generator for applying a trigger signal thereto in response to a selected number of output trigger signals from said comparator;
   sampling means including first and second sampling gates which are adapted to conduct momentarily in response to trigger signals applied thereto and also including signal amplitude storage means connected to the output of the second gate;
   an amplifier having selectable gain connected between the output of the first gate and the input of the second gate;
   means providing positive feedback from said storage means at the output of said second gate to the output of said first gate to enhance the sampling efficiency of said sampling means, the gain of said amplifier being maximum for said selected member set to lowest value and being less than maximum gain for said selected number set to a value greater than said lowest value.

2. A signalling circuit comprising:
   a generator for producing a staircase signal having stepwise variations in amplitude in response to trigger signals applied thereto;
   a comparator having a pair of inputs for producing an output trigger signal in response to signals applied to the inputs thereof attaining a predetermined relationship to each other;
   a source of recurring signal of time-varying amplitude;
   means connected to the inputs of said comparator for applying thereto the signals from said generator and said source;
   sampling means disposed to receive an input signal to be sampled and being adapted to produce an output sample pulse of an input signal at a sampling instant in response to a trigger signal applied thereto;
   circuit means for applying trigger signals to said sampling means in response to the output trigger signals from said comparator, the circuit means including a pulse-count divider connected to said generator for applying a trigger signal thereto in response to a selected number of output trigger signals from said comparator;
   a step signal generator for applying to a circuit element to be tested an output signal having an abrupt transition in response to an applied trigger signal;
   means connecting the sampling means for applying thereto as the signal to be sampled the signal from the circuit element to be tested; and
   first means connected to said step signal generator for applying a trigger signal thereto in response to the amplitude of a signal representative of the time-varying signal from said source attaining a selected value.

3. A signalling circuit as in claim 2 comprising:

display means including horizontal and vertical deflection apparatus for producing a visual display at coordinates representative of signals applied to the horizontal and vertical apparatus;

means connected to the horizontal deflection apparatus for applying a staircase signal thereto from said generator; and means connected to the sampling means and to the vertical deflection apparatus for applying signal thereto indicative of the output sample pulses from said sampling means.

4. A signalling circuit as in claim 2 wherein:

said first means includes a delay comparator having a pair of inputs and having an output connected to apply trigger signals to said step generator in response to signals applied to the inputs thereof attaining a predetermined relationship;

a source of reference signal is applied to one input of said delay comparator; and second means applies a signal of time-varying amplitude representative of the signal from said source to the other input of said delay comparator for initiating the abrupt transition in the output signal of said step generator.

5. A signalling circuit as in claim 4 wherein:

said second means includes a second source of signal of time-varying amplitude connected to said delay comparator for applying thereto said representative signal of time-varying amplitude; and a trigger generator is connected to said source and said second source for applying signals thereto to initiate the signals therefrom of time-varying amplitude at selected instants.

6. A signalling circuit as in claim 3 wherein:

the rate of variation with time of the signals from said source and said second source are adjusted simultaneously.

7. A signalling circuit as in claim 3 wherein:

said display device includes an input for altering the output level of the visual display in response to an applied control signal, and comprising:

a display comparator having a pair of inputs for applying a control signal to said display device in response to the signals applied to the inputs of said display comparator attaining a predetermined relationship to each other;

means connecting an input of the display comparator to receive the staircase signal; and a control source of signal connected to the other input of said display comparator for selecting the deflection location at which the output level of the visual display is altered in response to the value of signal from said control source.

8. A signalling circuit as in claim 7 wherein:

said control source includes a pair of serially connected resistors, at least one of which is variable and is coupled to a dial calibrated in units of distance;

a source of current is connected to supply current through said resistors; and said other input of the display comparator is connected to receive the voltage drop across at least said one of the resistors.